United States Patent
Wills et al.

(10) Patent No.: US 11,498,683 B2
(45) Date of Patent: Nov. 15, 2022

(54) KIT OF PARTS FOR ASSEMBLING AN AIRCRAFT SEAT UNIT

(71) Applicant: Safran Seats GB Limited, Cwmbran (GB)

(72) Inventors: Paul Wills, Cwmbran (GB); James Woodington, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 156 days.

(21) Appl. No.: 16/714,672

(22) Filed: Dec. 13, 2019

(65) Prior Publication Data
US 2020/0189744 A1   Jun. 18, 2020

(30) Foreign Application Priority Data
Dec. 14, 2018   (GB) ..................................... 1820393

(51) Int. Cl.
*B64D 11/06* (2006.01)
*B64D 11/00* (2006.01)

(52) U.S. Cl.
CPC ...... *B64D 11/0606* (2014.12); *B64D 11/0601* (2014.12); *B64D 11/0602* (2014.12); *B64D 11/0639* (2014.12); *B64D 2011/0046* (2013.01)

(58) Field of Classification Search
CPC ............ B64D 11/0606; B64D 11/0601; B64D 11/0602; B64D 11/0639; B64C 2011/0046
See application file for complete search history.

(56) References Cited

U.S. PATENT DOCUMENTS 5,131,607 A * 7/1992 Arnold ............... B64D 11/0693
244/118.6
5,553,813 A * 9/1996 Merensky .......... B64D 11/0693
244/118.6
(Continued)

FOREIGN PATENT DOCUMENTS

EP   0322930 A2   7/1989
EP   1707486 A1   10/2006
(Continued)

OTHER PUBLICATIONS

Europe Patent Application No. 19215930.9, Extended European Search Report, dated May 11, 2020.
(Continued)

*Primary Examiner* — Philip J Bonzell
*Assistant Examiner* — Colin Zohoori
(74) *Attorney, Agent, or Firm* — Kilpatrick Townsend & Stockton LLP (57) ABSTRACT

The invention provides a kit of parts for assembling an aircraft seat unit, comprising a frame with a slot, a panel for forming a shell of the aircraft seat unit and defining a footprint of the aircraft seat unit, having a first end and a second opposite end, the first end configured to be slid in and out of the frame slot to provide a variable dimension from the frame to second opposite end of the panel, and a fixing mechanism for fixing the panel within the frame slot, in a configuration providing a desired value of aircraft seat unit variable dimension. The invention also provides a plurality of such kits of parts, an aircraft seat unit and an aircraft cabin comprising a plurality of such aircraft seat units or made from such kit of parts, and methods of installing an aircraft seat unit.

21 Claims, 4 Drawing Sheets

(56) References Cited

U.S. PATENT DOCUMENTS

| | | | |
|---|---|---|---|
| 5,775,642 A | 7/1998 | Beroth | |
| 6,076,768 A | 6/2000 | Durant et al. | |
| 9,067,681 B2 * | 6/2015 | Cailleteau | B64D 11/06 |
| 2006/0170261 A1 * | 8/2006 | Baatz | B64D 11/06 |
| | | | 297/245 |
| 2009/0065643 A1 * | 3/2009 | Park | B64D 11/06 |
| | | | 244/122 R |
| 2016/0023746 A1 | 1/2016 | Knowles et al. | |
| 2016/0298370 A1 * | 10/2016 | Druckman | E05D 15/0643 |
| 2017/0106980 A1 * | 4/2017 | Kuyper | B64D 11/0606 |
| 2017/0259923 A1 | 9/2017 | Morgan | |
| 2018/0281963 A1 * | 10/2018 | Dowty | B64D 11/0606 |

FOREIGN PATENT DOCUMENTS

| | | |
|---|---|---|
| EP | 3666653 A1 | 6/2020 |
| WO | 9011930 A1 | 10/1990 |
| WO | 2018184778 | 10/2018 |

OTHER PUBLICATIONS

Europe Patent Application No. 19215930.9, Communication under Rule 71(3) EPC (Intention to Grant), dated Jun. 18, 2021.
United Kingdom Patent Application No. 1820393.5, Examination Report, dated Jun. 29, 2022.

* cited by examiner

KIT OF PARTS FOR ASSEMBLING AN AIRCRAFT SEAT UNIT

CROSS REFERENCE TO RELATED APPLICATION

This application claims the benefit of and priority to United Kingdom Patent Application No. 1820393.5, filed on Dec. 14, 2018, the entire contents of which application are hereby incorporated herein by this reference.

BACKGROUND OF THE INVENTION

The present disclosure relates to a kit of parts for assembling an aircraft seat unit.

The present invention concerns aircraft seating. More particularly, but not exclusively, this invention concerns a kit of parts for assembling an aircraft seat unit, the kit of parts comprising a panel for forming at least part of a shell of the aircraft seat unit and at least partially defining a footprint of the aircraft seat unit.

The invention also concerns a plurality of such kits of parts, an aircraft seat unit and an aircraft cabin comprising a plurality of such aircraft seat units or made from such kit of parts, and methods of installing an aircraft seat unit.

Known aircraft seat units and kits of parts for assembling them provide aircraft seat units with a fixed width. In other words, tooling (which is expensive to produce) is used to manufacture a shell/panel of an aircraft seat unit that has a certain width, length or height dimension. This tooling is used to manufacture the shell for all such aircraft seats to be manufactured and used in an aircraft cabin. For example, the same shell dimensions may be used, irrespective of the actual space available in the aircraft cabin for which the seat units are intended to be used. In an Airbus A330, the width of the cabin allows for each seat unit to have a width of approximately 1050 mm (allowing for a 1-2-1 layout and a required aisle width). In a Boeing 777, the same layout may provide space for a seat unit width of 1175 mm.

In order to manufacture seat units that can be used in both cabins, the tooling used produces a seat unit with a width of 1050 mm. This seat unit is used in the Airbus A330 cabin and also in the Boeing 777 cabin. In the Airbus A330 cabin, the seat unit fits in well with very little, if any, wasted width space. However, in the Boeing 777 cabin, there is a significant amount of width that cannot be fully utilised (in the region of 500 mm for each row of 4 seat units).

Of course, this wasted width space is undesirable, especially given that space is at such a premium in an aircraft cabin. The same problems also arise, although perhaps to a lesser extent, in relation to the available length and height in an aircraft cabin.

The present invention seeks to mitigate the above-mentioned problems. Alternatively or additionally, the present invention seeks to provide an improved kit of parts for assembling an aircraft seat unit.

SUMMARY OF THE INVENTION

The present invention provides, according to a first aspect, a kit of parts for assembling an aircraft seat unit, the kit of parts comprising a frame provided with a slot, a panel for forming at least part of a shell of the aircraft seat unit and at least partially defining a footprint of the aircraft seat unit, the panel having a first end and a second opposite end, the first end being configured to be slid in and out of the frame slot so as to provide a variable dimension from the frame to the second opposite end of the panel, such that the aircraft seat unit has a variable dimension, and a fixing mechanism for fixing the panel within the frame slot, in a configuration providing a desired value of the aircraft seat unit variable dimension.

The panel is configured for sliding in and out of the slot, in relation to the slot depth. I.e. the panel may be able to be slid in to the slot depth by only a shallow amount, or, at the other extreme, can be slid in to the slot by the whole slot depth (in other words, so that the first end of the panel abuts against the deepest point of the frame slot). The slot depth is, thus, defined as the dimension into/through the slot. The slot width is defined as the shortest dimension perpendicular to the depth. The first end of the panel generally has a width/thickness so as to fit in the slot width. The slot length is generally the longest dimension of the slot and defines the length over which the slot extends. In other words, the slot length provides for a length of panel (e.g. a height of the panel) that can be accommodated in the slot. The "footprint" is defined as the space taken up by the aircraft seat unit when viewed in plan—i.e. it may be defined by the width and length of the seat unit (if the footprint is a simple rectangle). It represents the space in the cabin to be used by a passenger in that seat unit.

Having a frame with a slot of a certain depth, allows the panel to be slid in and out of the slot and secured in place in different configurations. These different configurations define a different dimension to the seat unit (e.g. a seat shell width, height or length). This allows different seat unit sizes to be manufactured using the same tooling. Hence, the seat units are still economical to produce, whilst also providing flexibility and space-packing efficiency.

The slot in the frame also allows the first end of the panel to be hidden from view. This provides a suitable aesthetic to the seat unit.

Preferably, an interior width of the frame slot is wider than an exterior thickness of the first end of the panel. This allows the first end of the panel to be slid into the slot effectively. The rest of the panel may be thicker than the first end, or a portion of the panel adjacent the first end. This may allow the panel to allow be slid into the slot up to a point where the thickness of the panel entering the slot is the same as the slot width. This may provide a minimum dimension of the aircraft seat unit variable dimension. As an alternative, the panel may be able to be slid into the slot by the whole slot depth. In this case, the configuration where the first end of the panel abuts against the deepest point of the frame slot, provides the minimum dimension of the aircraft seat unit variable dimension.

More preferably, the interior width of the frame slot is wider than the exterior thickness of the first end of the panel, by 1 to 10 mm, and preferably by 1 to 5 mm. This provides adequate clearance and makes assembly of the aircraft seat unit easier.

Preferably, the frame slot has a depth between 25 mm and 300 mm, preferably between 100 mm and 200 mm and even more preferably between 100 mm and 150 mm. The amount of adjustability of the dimension of the aircraft seat unit may be provided by the depth of the slot so that, for example, a slot depth of 150 mm provides up to 150 mm of adjustability.

Preferably, the frame slot has a depth configurable to extend from a first height to a second height, so that the panel can be slid in and out of the frame slot so as provide a variable height of aircraft seat unit from the frame to the second opposite end of the panel. The first height is located at an outer edge of the frame. In use, the depth extends from the first height to the second height.

Alternatively or additionally, the frame slot has a depth configurable to extend from a first lateral position to a second lateral position, so that the panel can be slid in and out of the frame slot so as to provide a variable dimension from the frame to the second opposite end of the panel, such that the footprint of the aircraft seat unit has a variable dimension. This provides a variable width or length of aircraft seat unit from the frame to the second opposite end of the panel. The first lateral position is located at an outer edge of the frame. In use, the depth extends from a first width/length (lateral position) to the second width/length (lateral position) with respect to the unit.

Preferably, the kit of parts further comprises a seat, for being provided within the footprint of the aircraft seat unit. The kit of parts may also comprise an attachment mechanism to attach the seat, preferably one or more seat spar tubes of the seat, to the panel. The seat may be attached to the panel such that the back of the seat is adjacent or facing the panel. The seat may be attached to face the direction of travel in relation to the aircraft cabin.

Preferably, the kit of parts further comprises a piece of furniture, such as a side console, for being provided within the footprint of the aircraft seat unit. The kit of parts may also comprise an attachment mechanism to attach the piece of furniture to the panel. The piece of furniture may be attached to the panel adjacent to the seat. The piece of furniture may be a table.

Preferably, the footprint of the aircraft seat unit, at least partially defined by the panel, is substantially rectangular. The substantially rectangular footprint may comprise rounded corners. The footprint may be any suitable regular shape (to allow tessellation), such as a parallelogram.

Preferably, the kit of parts is for assembling two adjacent first and second aircraft seat units, wherein the panel is for forming at least part of a shell of a first aircraft seat unit and at least partially defining a footprint of the first aircraft seat unit, the kit of parts further comprises a second panel forming at least part of a shell of a second aircraft seat unit and at least partially defining a footprint of the second aircraft seat unit, the frame is provided with two slots, wherein a first end of the first panel is configured to be slid in and out of the first frame slot so as to provide a variable dimension from the frame to the second opposite end of the first panel, such that the footprint of a first aircraft seat unit has a variable dimension, and wherein a first end of the second panel is configured to be slid in and out of the second frame slot so as to provide a variable dimension from the frame to the second opposite end of the second panel, such that the second aircraft seat unit has a variable dimension, the fixing mechanism is for fixing the first panel and the frame together in a configuration providing a desired value of the first aircraft seat unit variable dimension, and wherein the kit of parts further comprises a second fixing mechanism for fixing the second panel and the frame together in a configuration providing a desired value of the second aircraft seat unit variable dimension.

This kit of parts allows the same frame to provide for two panels to be slid in and out of one of the slots, thus providing a variable dimension to two aircraft set units.

The two slot may be joined together as one joint slot. One panel may prevent a second panel from being slid in too far into the joint slot.

More preferably, the frame has a first portion providing the first slot and a second portion providing the second slot, and wherein the first and second portions are co-planar. For example, the first slot may have a depth extending into the first portion and the second slot may extend into the second portion. Hence, the two slots, and thus the two panels are coplanar. This is useful for a substantially rectangular aircraft seat unit footprint.

Alternatively, the frame may have a first portion providing the first slot and a second portion providing the second slot, and wherein the first and second portions are mounted at an angle to each other. For example, the first slot may have a depth extending into the first portion and the second slot may extend into the second portion. Hence, the two slots, and thus the two panels are at an angle to each other. This is useful for a herringbone aircraft seat unit arrangement. Here, the angle between the portions is generally double the herringbone angle of the units to a cabin longitudinal axis.

Preferably, the first or second fixing mechanism comprises an insert member extending at least partially through both the frame and panel. The insert member may extend through the thickness/width of the frame, i.e. substantially perpendicular to and across the slot depth.

Preferably, the first and/or second panel comprises a sandwich structure of a honeycomb core structure and one or more skins. Alternatively, the first and/or second panel may comprise sheet metal.

Preferably, the kit of parts is for assembling a business class aircraft seat unit or a first class aircraft seat unit.

According to a second aspect of the invention there is also provided a plurality of kits of parts as described above, for providing an aircraft cabin comprising a number of aircraft seat units.

According to a third aspect of the invention there is also provided an aircraft seat unit comprising a shell at least partially defining a footprint of the aircraft seat unit, the shell comprising a frame provided with a slot with a given depth, a panel having a first end and a second opposite end, the first end being inserted in the frame slot such that the first end is provided only partway along the depth of the slot, and a fixing mechanism fixing the first end relative to the frame.

Preferably, the aircraft seat unit further comprises a seat, for being provided within the footprint of the aircraft seat unit. The aircraft seat unit may also comprise an attachment mechanism to attach the seat, preferably one or more seat spar tubes of the seat, to the panel. The seat may be attached to the panel such that the back of the seat is adjacent or facing the panel. The seat may be attached to face the direction of travel in relation to the aircraft cabin.

According to a fourth aspect of the invention there is also provided an aircraft cabin comprising a plurality of aircraft seat units as described above or made from a kit of parts as described above.

The aircraft cabin may comprise a row of aircraft seats in a 1-1, 1-1-1 or 1-2-1 arrangement, where "1" represent one single seat unit in the row, "2" represents a pair of adjacent seat units, not separated from each other by an aisle in the row, and "-" represents an aisle in the row.

More preferably, in a row of aircraft seat units, two adjacent aircraft seat units in the row are made from a "two panel" kit of parts as described above. The row of aircraft seats may have a 1-2-1, 2-2-2 or 2-2 arrangement, where "1" represent one single seat unit in the row, "2" represents a pair of adjacent seat units, not separated from each other by an aisle in the row and preferably made from a "two panel" kit of parts as described above, and "-" represents an aisle in the row.

According to a fifth aspect of the invention there is also provided a method of installing an aircraft seat unit, the method comprising the steps of providing a kit of parts as described above, and fixing the frame and panel together in the configuration providing the desired value of the aircraft seat unit variable dimension.

According to a sixth aspect of the invention there is also provided a method of installing an aircraft seat unit, the method comprising the steps of providing a frame provided with a slot, providing a panel for forming at least part of a shell of the aircraft seat unit and at least partially defining a footprint of the aircraft seat unit, the panel having a first end and a second opposite end, the first end being configured to be slid in and out of the frame slot so as to provide a variable dimension from the frame to the second opposite end of the panel, such that the aircraft seat unit has a variable dimension, providing a fixing mechanism for fixing the panel and the frame, choosing a desired value of the aircraft seat unit variable dimension, and fixing the frame and panel together in a configuration providing that desired dimension.

Preferably, the aircraft seat unit comprises a seat, and the seat is provided within the footprint of the aircraft seat unit. The aircraft seat unit may also comprise an attachment mechanism to attach the seat, preferably one or more seat spar tubes of the seat, to the panel. The seat may be attached to the panel such that the back of the seat is adjacent or facing the panel. The seat may be attached to face the direction of travel in relation to the aircraft cabin.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
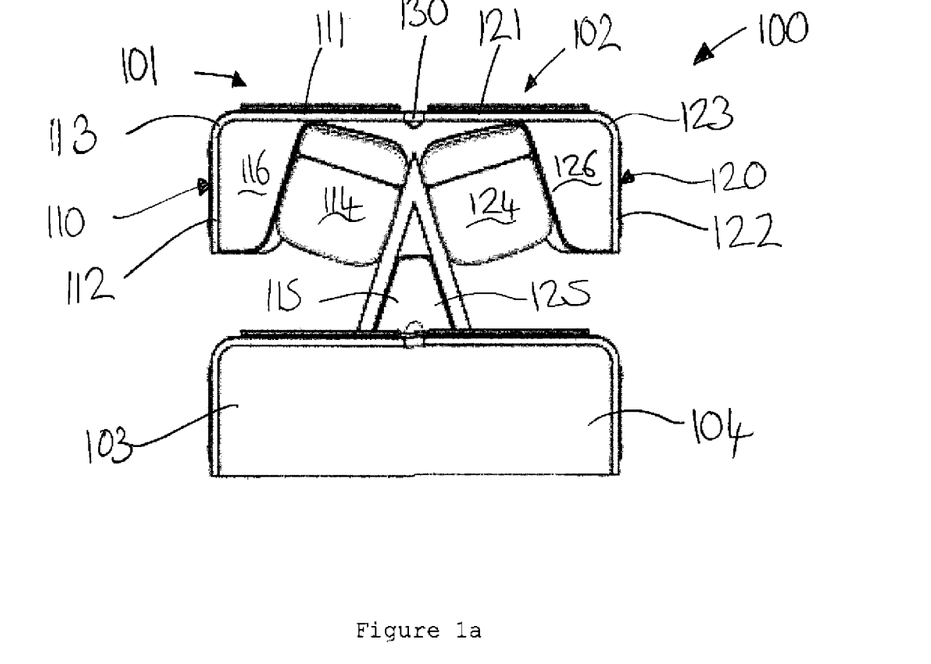
FIG. 1a shows a plan view of a pair of aircraft seat units, according to a first embodiment of the invention, the seat units in a first configuration.

FIG. 1a shows a plan view of a pair 100 of business class aircraft seat units 101, 102, according to a first embodiment of the invention. The seat units 101, 102 are in a first configuration. The pair 100 comprises a left seat unit 101 and a right seat unit 102. There is also a second pair of seat units 103, 104 in front of seat units 101, 102.

Each seat unit is similar and will be described in relation to the left seat unit 101. The same description applies to the right seat unit 102 (using the same reference numerals with "x1y" replaced by "x2y", i.e. 113 corresponds to 123). The third 103 and fourth 104 seat units are also similar.

The left hand seat unit 101 comprises a shell 110. The shell 110 is in the form of a panel with; a back portion 111, which extends behind a seat 114 of the unit, a curved corner 113 and a side portion 112 (extending at a right angle to the back portion 111). Hence, the shell 110 defines a footprint of the seat unit 110 with a width. The seat 114 is facing forwards (although at a slight angle away from the right seat unit 102) to the direction of travel of the aircraft cabin. The panel has a first end 111a that is located in a frame 130, as will be described later in relation to FIGS. 2a and 2b. The panel also has a second opposite end 112b at the front end of the side portion 112, as will also be described later in relation to FIGS. 2a and 2b. The panel is made of composite material with a sandwich structure of a honeycomb core structure and one or more skins.

The left seat unit 101 also comprises a side console 116 located to the left of the seat 114 (to the right for a passenger sat in the seat), adjacent the side portion 112. The left seat unit 101 also comprises a middle console 115 located to the right of the seat (to the left for a passenger sat in the seat), adjacent the right seat unit 102. The seat 114 (in particular the spar tube of the seat) and side console 116 are attached to the shell 110.

Similarly, the right seat unit 102 also comprises a side console 126 located to the right of the seat 124 (to the left for a passenger sat in the seat), adjacent the side portion 122. The right seat unit 102 also comprises a middle console 125 located to the left of the seat (to the right for a passenger sat in the seat), adjacent the left seat unit 101.

In FIG. 1a, the two seats 114, 124 are comparatively close together and the middle consoles 115, 125 are comparatively small.

Figure 1B:
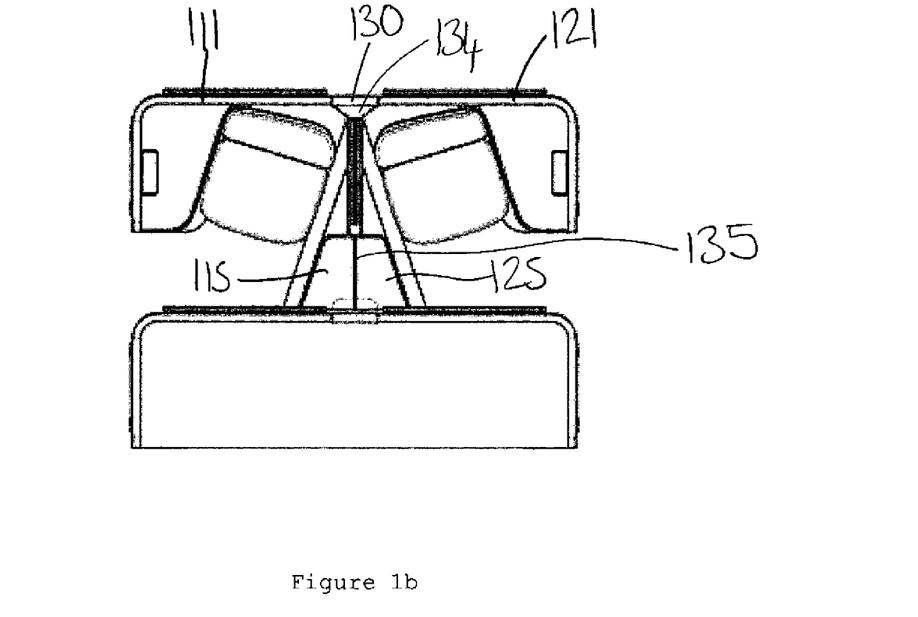
FIG. 1b shows a plan view of the same pair of aircraft seat units, according to a first embodiment of the invention, the seat units in a second configuration.

FIG. 1b shows a plan view of the same pair of aircraft seat units 100, the seat units in a second configuration. In this second configuration, the two seats 114, 124 are comparatively further apart and the middle consoles 115, 125 are comparatively large. In addition, a partition wall 135 is located in between the two middle consoles 115, 125 to provide privacy between the passengers in seats 114, 124. The partition wall 135 is mounted to a partition wall mounting 134, as will be described later in relation to FIGS. 3a and 3b.

Figure 2A:
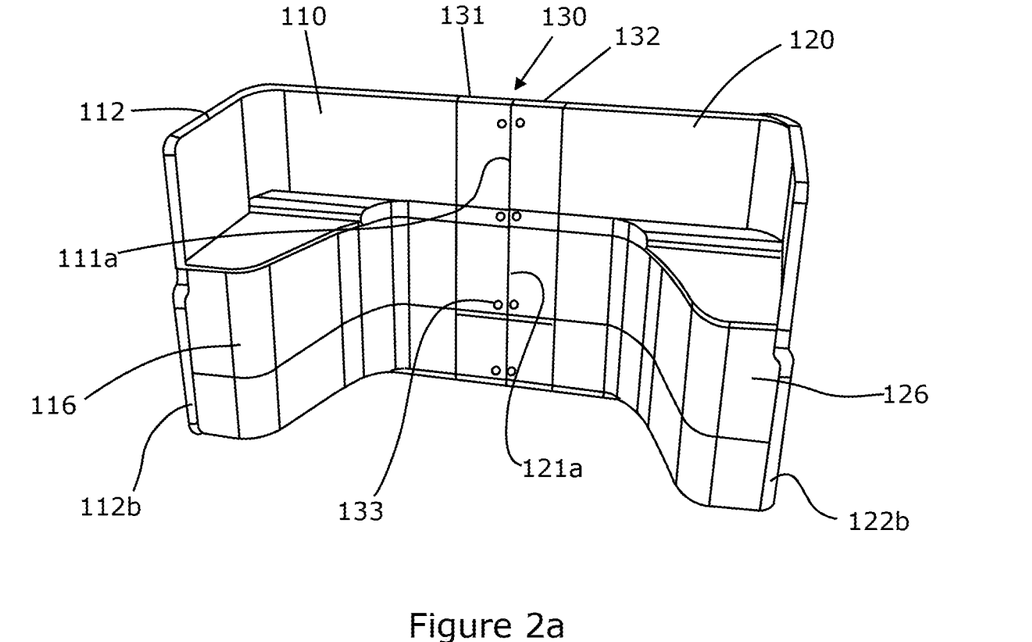
FIG. 2a shows a perspective view of the two panels of the pair of aircraft seat units, in the first configuration.

FIG. 2a shows a perspective view of the two panels 110, 120 of the pair of aircraft seat units, in the first configuration. Here, it can be seen that the first end 111a of the left seat unit panel 110 (on a right side of the back portion 111) is inserted into a slot portion 131 of the frame 130. It is held there by four fixings (one labelled as 133 in FIG. 2a) distributed along the height of the frame 130. The fixings are in the form of screws placed through potted inserts in the composite panel. The first end 111a is slid into the slot portion 131 by a depth corresponding to the slot portion (and also corresponding to half the depth of the slot formed by both the left portion 131 and similar right slot portion 132). Hence, the footprint defined by the shell and frame 130 for the left seat unit 101 extends a width from the central part of the frame 130 to the side portion of the panel 112 (including second end 112b). This corresponds to the length of the back portion 111.

The first end 121a of the right seat unit panel 120 (on a left side of the back portion 121) is inserted into and held in the right slot portion 132 of the frame 130, in a similar (mirror image) way. Hence, the footprint defined by the shell and frame 130 for the right seat unit 102 extends a width from the central part of the frame 130 to the side portion of the panel 122 (including second end 122b). This corresponds to the length of the back portion 121.

Figure 2B:
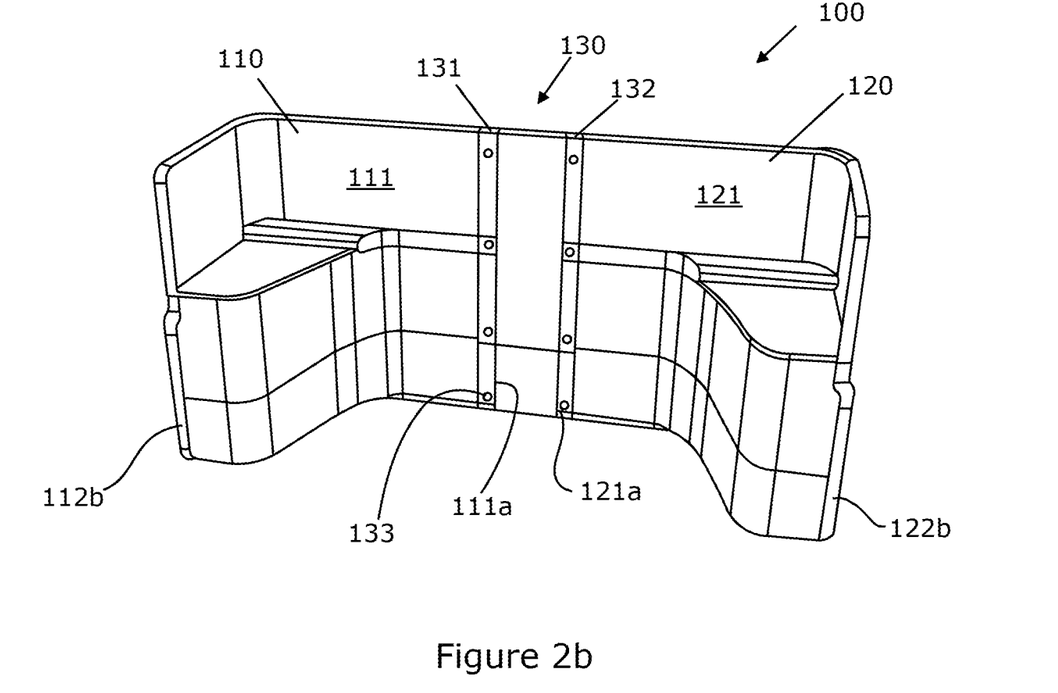
FIG. 2b shows a perspective view of the two panels of the pair of aircraft seat units, in the second configuration.

FIG. 2b shows a perspective view of the two panels 110, 120 of the pair of aircraft seat units, in the second configuration. Here, it can be seen that the first end 111a of the left seat unit panel 110 (on a right side of the back portion 111) is inserted into the slot portion 131 of the frame 130 by only a short distance. It is held there by four fixings (one labelled as 133 in FIG. 2b) distributed along the height of the frame 130. Hence, the footprint defined by the shell and frame 130 for the left seat unit 101 extends a width from the central part of the frame 130 to the side portion of the panel 112 (including second end 112b). This corresponds to the length of the back portion 111 plus most of half the width of the frame 130. The first end 121a of the right seat unit panel 120 (on a left side of the back portion 121) is inserted into and held in the right slot portion 132 of the frame 130, in a similar (mirror image) way. Hence, the footprint defined by the shell and frame 130 for the right seat unit 102 extends a width from the central part of the frame 130 to the side portion of the panel 122 (including second end 122b). This corresponds to the length of the back portion 121 plus most of half the width of the frame 130.

It can be seen in these Figures that the interior width of the slot portions 131, 132 is wider than the exterior thickness of the first end 111a, 121a of the panels. It is wider by approximately 4 mm. Each slot portion 131, 132 has a depth of approximately 125 mm.

Figure 3A:
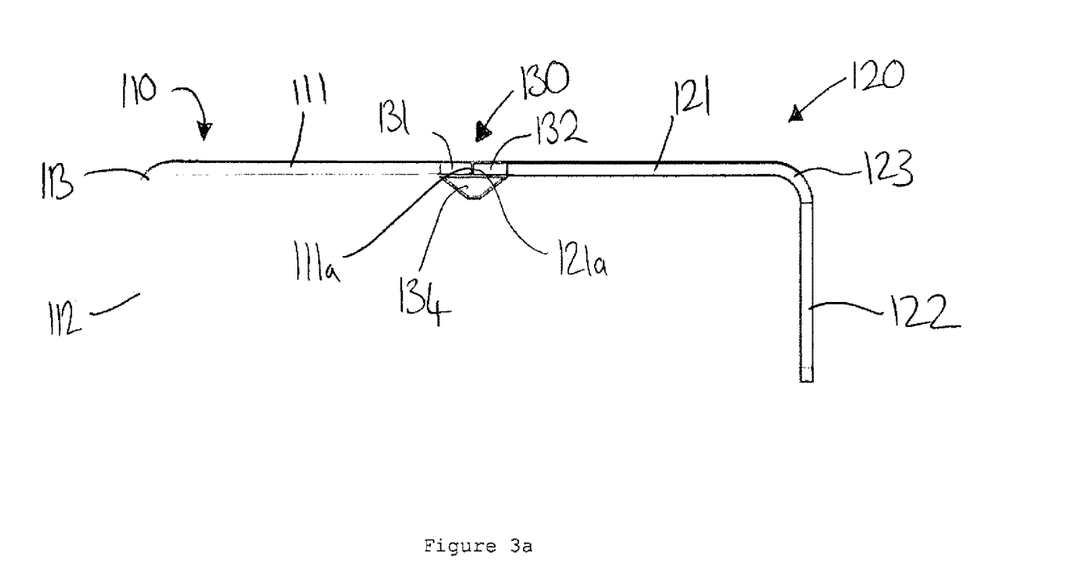
FIG. 3a shows a plan view of the frame and two panels of the pair of aircraft seat units, in the first configuration.
Figure 3B:
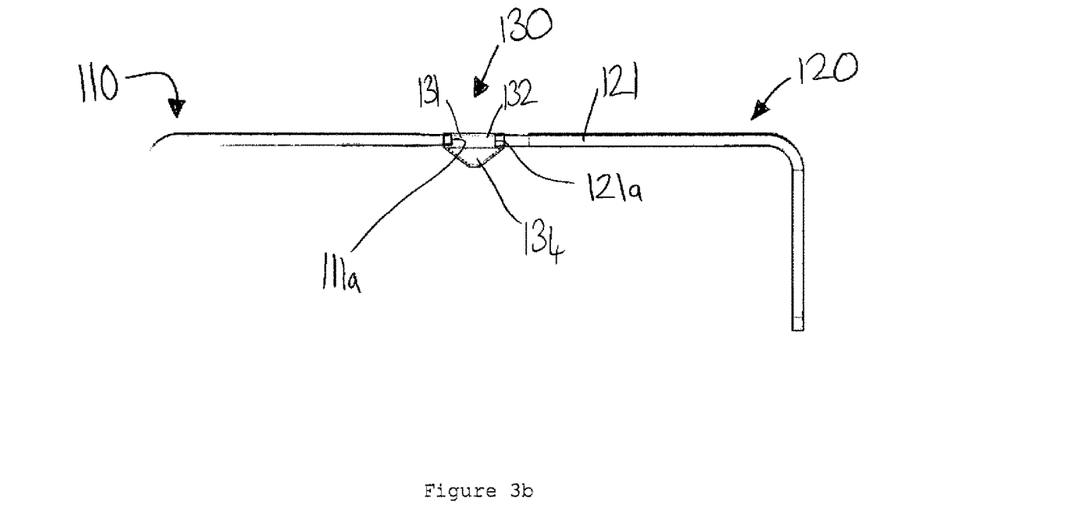
FIG. 3b shows a plan view of the frame and two panels of the pair of aircraft seat units, in the second configuration.

FIGS. 3a and 3b are more detailed plan views of the panels 110, 120 in the first and second configurations. Here, the distance by which the first ends 111a, 121a, are slid into the frame slot potions 131, 132 are clear. In FIG. 3a, the two ends 111a, 121a abut each other and prevent further movement into the slot portions 131, 132. They have both been slid into the slot portions by the full depth of 125 mm.

In FIG. 3b, the ends 111a, 121a, are only slid into the slot potions by a relatively small distance (40 mm), leaving a gap between the ends 111a, 121a in the frame 130 of 170 mm. The frame 130 covers this gap. It is noted that the frame 130 comprises a single slot through it, including slot portions 131 and 132.

These Figures also show the partition wall mounting 134, as a front portion of the frame 130 and in front of the slot portions 131, 132.

Figure 4:
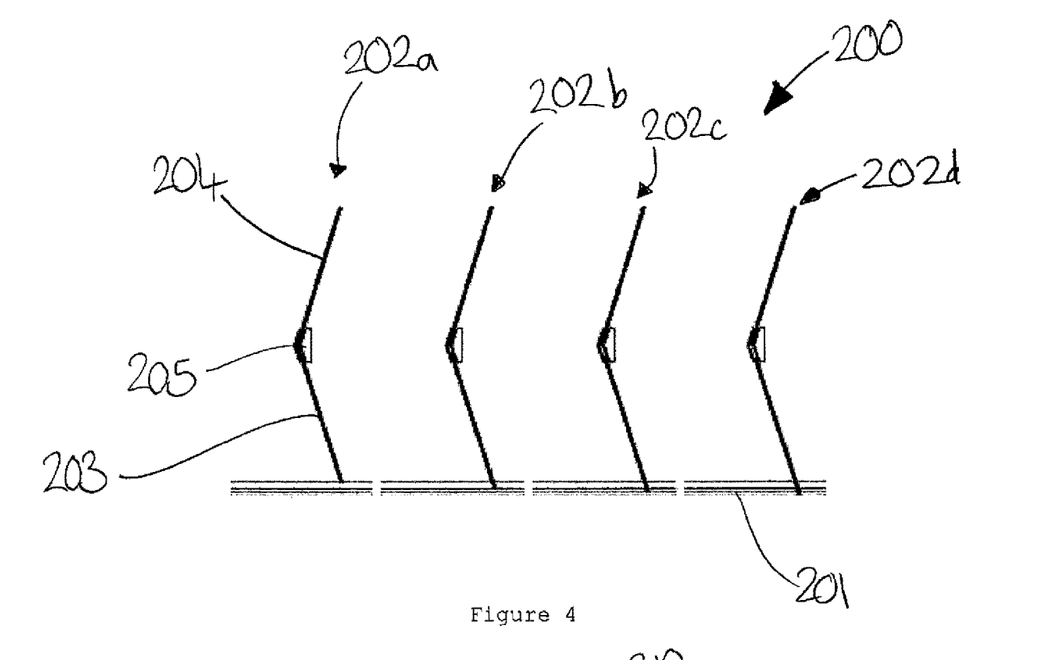
FIG. 4 shows a plan schematic view of a plurality of "frame and two panels", each part of a pair of aircraft seat units, according to a second embodiment of the invention.

FIG. 4 shows a plan schematic view of part of an aircraft cabin arrangement 200 with a plurality of "frame and two panels", each part of a pair of aircraft seat units, according to a second embodiment of the invention. Here, the arrangement 200 is shown with four pairs 202a, 202b, 202c, 202d of aircraft seat units, with each seat unit in the pair being in a herringbone, angled relationship to each other. Each seat unit has a back shell panel, designated as 203 for the seat units towards the bottom of the figure, against the cabin aisle 201, and designated as 204 for the seat units towards the top of the figure. The panels 203, 204 are similarly at an angle to each other (in a "V" shape). The panels are held together by a frame 205 including two slot portions (not labelled) also at the same angle to each other into which the panels 203, 204 are slid. Similarly to the first embodiment, the panels 203, 204 can be slid into the slots of the frame 205 by a chosen amount (and held in place by fixings), to thus choose the width dimension of each seat unit.

Figure 5:
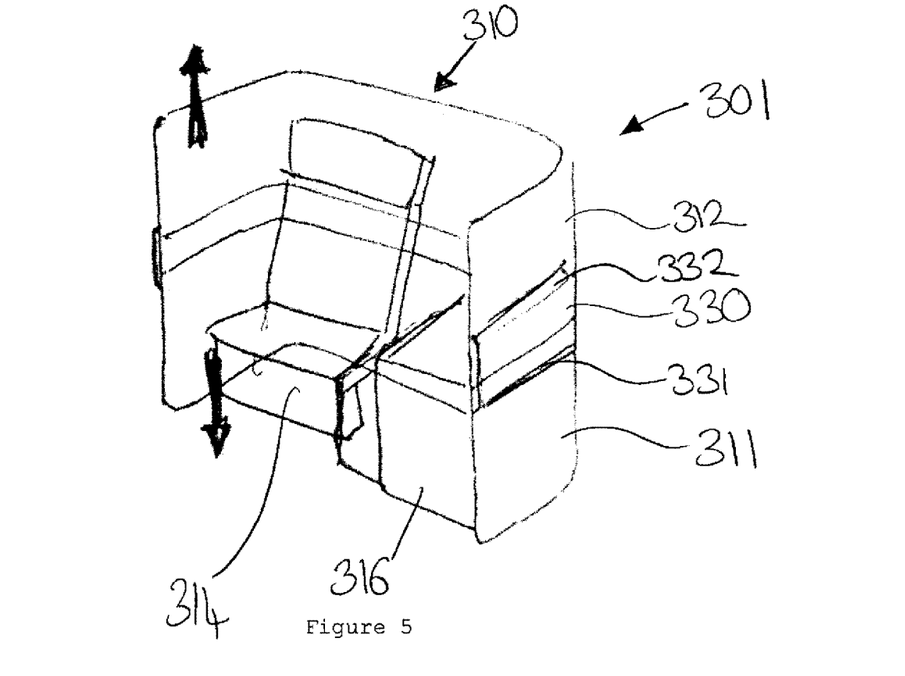
FIG. 5 shows a perspective view of an aircraft seat unit, according to a third embodiment of the invention.

FIG. 5 shows a perspective view of an aircraft seat unit 301, according to a third embodiment of the invention. Here, the seat unit comprises a seat 314, and side console 316 in a shell 310, in a similar way for the first and second embodiments. A difference here is that the shell 310 comprises a lower portion 311 and an upper portion 312. Both upper and lower portions are shaped with two side portions and a back portion to extend around the seat 314 and define a footprint of the seat unit. The upper and lower portions 311, 312 both have ends (at an upper end of the lower portion 311 and a lower end of the upper portion 312) that are inserted into a slot portion of a frame 330, positioned in between the two portions 311, 312. In particular, the lower end of the upper portion 312 is inserted into an upper slot portion 332 of the frame 330 and the upper end of the lower portion 311 is inserted into a lower slot portion 331 of the frame 330. Once the desired insertion distance is achieved, the frame 330 is fixed in place in relation to the upper and lower portions 312, 311. Hence, a height of the seat unit 301 (extending from a lower end of the lower portion 311 to an upper end of the upper portion 312) can be chosen.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The frame 130, 205, 330 may comprises two individual slots, rather than a single slot including slot portions 131 and 132. I.e. the slot portions 131, 132 may be separated by a barrier in the frame 130 so that they form two individual slots in the frame 130. In this arrangement, the insertion depth of the relevant panel is limited by the barrier, rather than by the other panel.

The frame 130, 205, 330 may be permanently or integrally attached to one of the panels 110, 120, 203, 204 or portions 311, 312 such that only one of the panels/portions can be moved in relation to the frame.

The interior width of the slot portions 131, 132 may be wider than the exterior thickness of the first end of the panels by any suitable distance. Each slot or slot portion may have any suitable depth.

The panels/portions may (instead) comprise sheet metal.

The invention may be applied to any suitable aircraft seat unit, including first class aircraft seat units.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. A kit of parts for assembling an aircraft seat unit, the kit of parts comprising:
    a frame provided with a slot, wherein the slot has a depth configurable to extend from a first lateral position to a second lateral position,
    a panel for forming at least part of a shell of the aircraft seat unit and at least partially defining a footprint of the shell of the aircraft seat unit, the shell being independent from a seat back of a seat of the aircraft seat unit, the panel having a first end and a second opposite end, the first end being configured to be slid in and out of the frame slot so as to provide a variable width from the frame to the second opposite end of the panel, such that the footprint of the shell of the aircraft seat unit has a variable width, and a fixing mechanism for fixing the panel within the frame slot, in a configuration providing a desired value of the aircraft seat unit variable width.

2. A kit of parts as claimed in claim 1, wherein an interior width of the frame slot is wider than an exterior thickness of the first end of the panel.

3. A kit of parts as claimed in claim 2, wherein the interior width of the frame slot is wider than the exterior thickness of the first end of the panel by 1 to 10 mm.

4. A kit of parts as claimed in claim 1, wherein the frame slot has a depth between 25 mm and 300 mm.

5. A kit of parts as claimed in claim 1, wherein the frame slot has a depth configurable to extend from a first height to a second height, so that the panel can be slid in and out of the frame slot so as provide a variable height of aircraft seat unit from the frame to the second opposite end of the panel.

6. A kit of parts as claimed in claim 1, wherein the fixing mechanism is configurable to fix the panel at a plurality of locations within the frame slot.

7. A kit of parts as claimed in claim 1, wherein the kit of parts further comprises a seat, for being provided within the footprint of the aircraft seat unit.

8. A kit of parts as claimed in claim 1, wherein the kit of parts further comprises a piece of furniture, such as a side console, for being provided within the footprint of the aircraft seat unit.

9. A kit of parts as claimed in claim 1, wherein the footprint of the aircraft seat unit, at least partially defined by the panel, is substantially rectangular.

10. A kit of parts as claimed in claim 1, wherein the kit of parts is for assembling two adjacent first and second aircraft seat units, wherein:
    the panel is for forming at least part of a shell of a first aircraft seat unit and at least partially defining a footprint of the first aircraft seat unit, the kit of parts further comprises a second panel forming at least part of a shell of a second aircraft seat unit and at least partially defining a footprint of the second aircraft seat unit,
    the frame is provided with two slots, wherein a first end of the first panel is configured to be slid in and out of the first frame slot so as to provide a variable width from the frame to the second opposite end of the first panel, such that the footprint of a first aircraft seat unit has a variable width, and wherein a first end of the second panel is configured to be slid in and out of the second frame slot so as to provide a variable width from the frame to the second opposite end of the second panel, such that the second aircraft seat unit has a variable width,
    the fixing mechanism is for fixing the first panel and the frame together in a configuration providing a desired value of the first aircraft seat unit variable width, and wherein the kit of parts further comprises a second fixing mechanism for fixing the second panel and the frame together in a configuration providing a desired value of the second aircraft seat unit variable width.

11. A kit of parts as claimed in claim 10, wherein the frame has a first portion providing the first slot and a second portion providing the second slot, and wherein the first and second portions are co-planar.

12. A kit of parts as claimed in claim 10, wherein the frame has a first portion providing the first slot and a second portion providing the second slot, and wherein the first and second portions are mounted at an angle to each other.

13. A kit of parts as claimed in claim 10, wherein the first or second fixing mechanism comprises an insert member extending at least partially through both the frame and panel.

14. A kit of parts as claimed in claim 10, wherein the first and/or second panel comprises a sandwich structure of a honeycomb core structure and one or more skins.

15. A kit of parts as claimed in claim 1, wherein the kit of parts is for assembling a business class aircraft seat unit or a first class aircraft seat unit.

16. A plurality of kits of parts as claimed in claim 1, for providing an aircraft cabin comprising a number of aircraft seat units.

17. An aircraft seat unit comprising a shell at least partially defining a footprint of the shell of the aircraft seat unit, the shell being independent from a seat back of a seat of the aircraft seat unit, and the shell comprising:
    a frame provided with a slot with a given depth, wherein the depth configurable to extend from a first lateral position to a second lateral position,
    a panel having a first end and a second opposite end, the first end being inserted in the frame slot such that the first end is provided only partway along the depth of the slot, wherein a depth of insertion of the first end determines a width of the footprint of the shell of the aircraft seat unit, and
    a fixing mechanism fixing the first end relative to the frame.

18. An aircraft cabin comprising a plurality of aircraft seat units that are according to claim 17.

19. An aircraft cabin according to claim 18, wherein, in a row of aircraft seat units, two adjacent aircraft seat units of the row are made from a kit of parts.

20. A method of installing an aircraft seat unit, the method comprising the steps of:
    providing a kit of parts according to claim 1, and
    fixing the frame and panel together in the configuration providing the desired value of the aircraft seat unit variable width.

21. A method of installing an aircraft seat unit, the method comprising the steps of:
    providing a frame provided with a slot, wherein the slot has a depth configurable to extend from a first lateral position to a second lateral position,
    providing a panel for forming at least part of a shell of the aircraft seat unit and at least partially defining a footprint of the shell of the aircraft seat unit, the shell being independent from a seat back of a seat of the aircraft seat unit, and the panel having a first end and a second opposite end, the first end being configured to be slid in and out of the frame slot so as to provide a variable width from the frame to the second opposite end of the panel, such that the footprint of the shell of the aircraft seat unit has a variable width,
    providing a fixing mechanism for fixing the panel and the frame,
    choosing a desired value of the aircraft seat unit variable width, and
    fixing the frame and panel together in a configuration providing that desired value.

* * * * *

UNITED STATES PATENT AND TRADEMARK OFFICE
CERTIFICATE OF CORRECTION

PATENT NO. : 11,498,683 B2
APPLICATION NO. : 16/714672
DATED : November 15, 2022
INVENTOR(S) : Paul Wills and James Woodington It is certified that error appears in the above-identified patent and that said Letters Patent is hereby corrected as shown below:

On the Title Page

Foreign Application Priority Data:
In (30) Line 1: Replace 1820393 with --1820393.5--.

Signed and Sealed this
Twenty-seventh Day of December, 2022

Katherine Kelly Vidal
Director of the United States Patent and Trademark Office